R. S. SWOPE.
AUTO JACK AND POWER MECHANISM.
APPLICATION FILED NOV. 12, 1918.

1,378,632.

Patented May 17, 1921.
2 SHEETS—SHEET 1.

Inventor
Ralph S. Swope,
By
Attorney

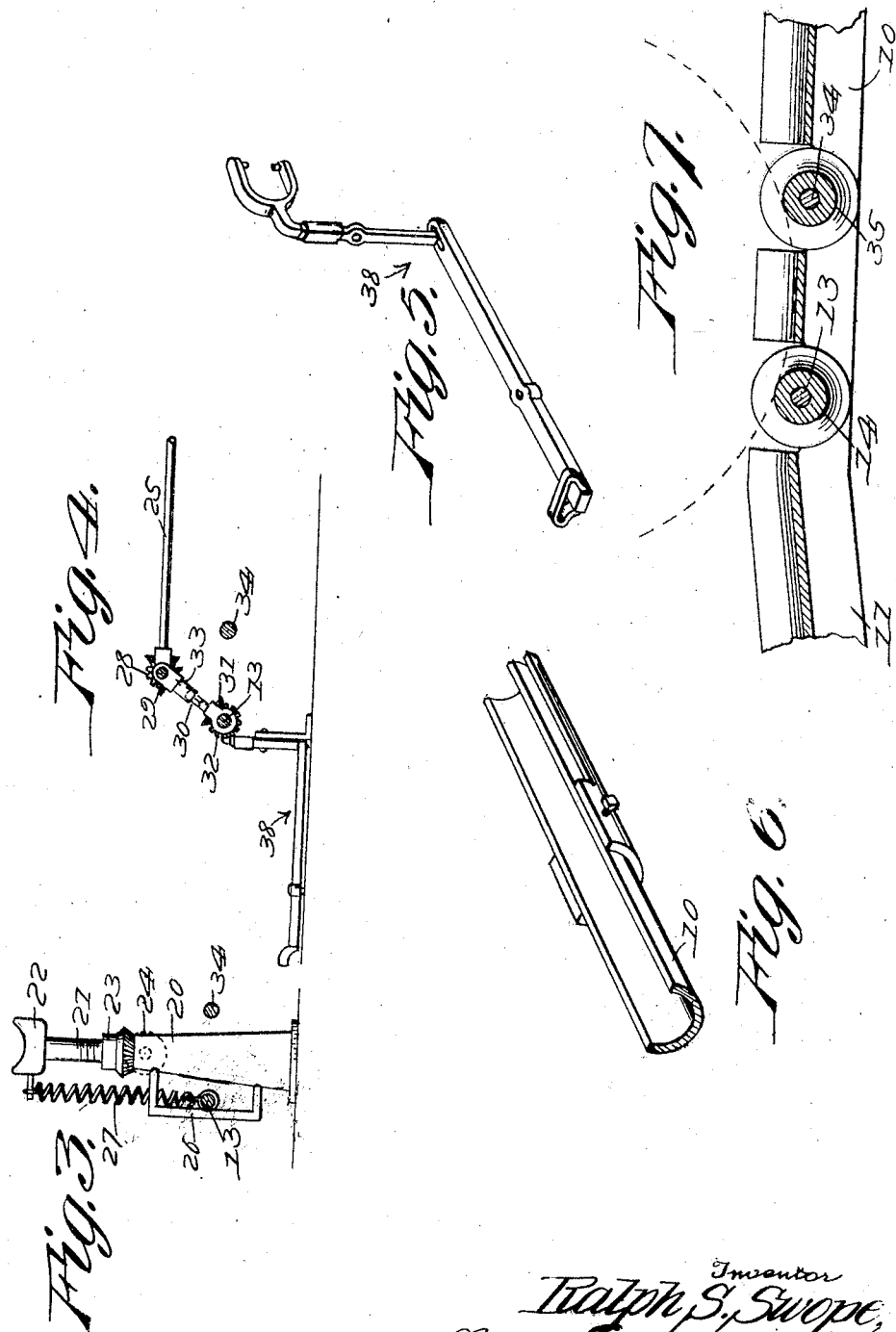

UNITED STATES PATENT OFFICE.

RALPH S. SWOPE, OF REDFIELD, SOUTH DAKOTA.

AUTO-JACK AND POWER MECHANISM.

1,378,632.   Specification of Letters Patent.   Patented May 17, 1921.

Application filed November 12, 1918. Serial No. 262,255.

*To all whom it may concern:*

Be it known that I, RALPH S. SWOPE, a citizen of the United States, residing at Redfield, in the county of Spink and State of South Dakota, have invented new and useful Improvements in Auto-Jack and Power Mechanism, of which the following is a specification.

The object of the invention is to provide a mechanism adapted for use as the means for elevating an automobile so as to relieve the tire pressure, permit of repairs, replacing of tires and the like, and also adapt it for use as a power mechanism for use in a garage or on the farm for driving light machinery, and serving to effectively utilize the motive power of the automobile engine.

Further objects and advantages will appear in the course of the following description, it being understood that changes in form and proportion may be resorted to within the scope of the claims without departing from the spirit of the invention.

In the drawings:—

Fig. 3 is a section on the line 3—3 of Fig. 1.

Fig. 4 is a section on the line 4—4 of Fig. 1.

Fig. 5 is a perspective view of the operating element by means of which the clutch mechanism connecting with the several jacks is rendered operative or inactive.

Fig. 6 is a perspective detail showing the extensible connection provided for the wheel tracks.

Fig. 7 is a longitudinal sectional detail view of Fig. 1 taken in the vicinity of the main drive shaft and the auxiliary shaft.

Figure 1:
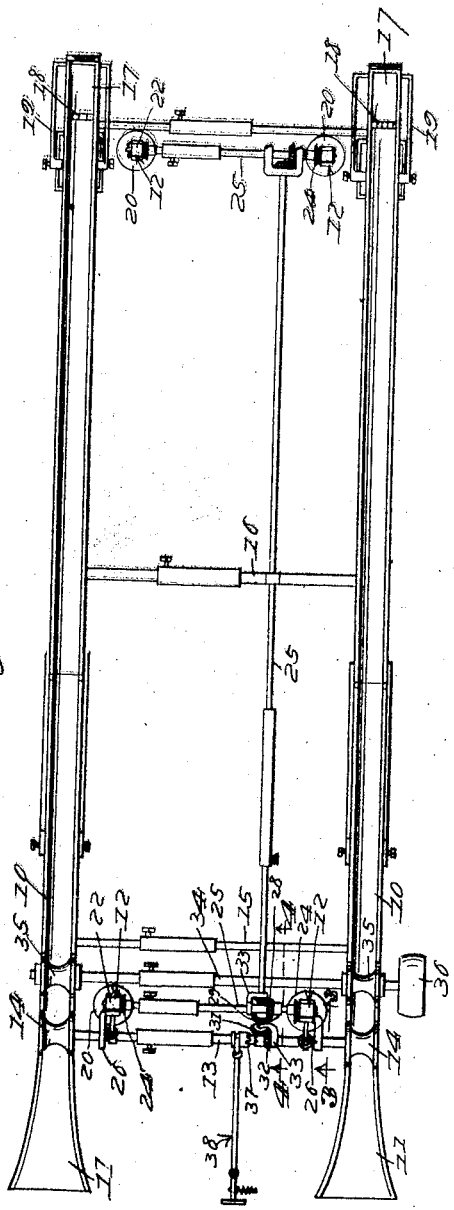
Figure 1 is a plan view of an apparatus constructed in accordance with the invention.
Figure 2:
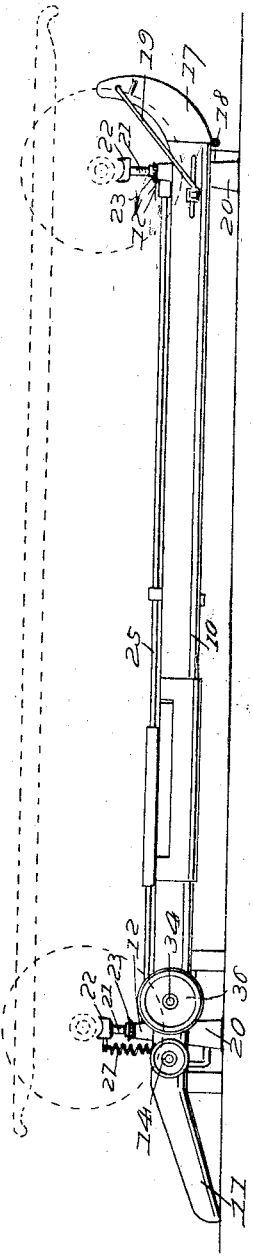
Fig. 2 is a side view of the same indicating the position of an automobile thereon.

Essentially the device consists of a frame or bed embodying parallel wheel tracks 10, preferably concaved to form guides for the tires of automobile wheels and having their front ends enlarged laterally as shown at 11 to form entrance guides so as to facilitate the direction of the wheels in locating the machine upon the frame, a plurality of screw jacks 12 arranged in pairs for engagement respectively with the front and rear axles of the machine, a driving shaft 13 having terminal tread portions or spools 14 for engagement by the wheel treads, and connections between the driving shaft and the jacks by means of which the latter may be operated to raise or lower the machine. While it is obvious that the tracks may be fixed or formed as a part of a permanent base or floor as in a garage, the illustrated embodiment of the invention represents a portable frame or base in which the track members are connected by terminal and intermediate transverse bars 15 and 16 which are of extensible construction, having telescoping elements which permit of the separation to a greater or less extent of the tracks to suit the width of base of the machine. Correspondingly the tracks are of extensible construction, comprising relatively adjustable telescoping members or elements, to suit the length of the tread of the machine and at the rear ends the tracks are provided with movable stops 17 designed to check the forward movement of the machine in traversing the tracks by the contact therewith of the forward or steering wheels. These stops are preferably curved as shown, being hinged to the body portions of the tracks at as 18 and being normally held in an upright position by braces 19 which however may be disconnected to allow the stops to be lowered when it is desired to operate in connection with a forward wheel of the car for the purpose for example of replacing a tire.

The screw jacks may be of any preferred construction, but as illustrated consist of an ordinary and well known type wherein the standard 20 supports a feed screw 21 to which is attached the usual swiveled shoe 22 for engagement with the axle of the automobile, a gear nut 23 being mounted upon the standard in engagement with said feed screw and in turn having engaged therewith the operating gear 24 by the rotation of which the feed screw with its attached shoe is either elevated or depressed. The operating gears of the several screw jacks are connected by extensible shafts 25, disposed respectively transversely and longitudinally of the frame and the elements of which are adapted to be adjusted to correspond with the adjustment of the tracks to suit machines having different tread lengths and widths.

The drive shaft 13 extends through guides 26 formed on the shanks or standards of the screw jacks and a yielding connection consisting for example of springs 27 is established between the shaft and the shoes of the jacks which engage the rear axle of the car, so that as the jacks raise the said axle, these supporting elements consisting of the springs serve to hold the shaft in position to maintain an operative contact between its treads or spools 14 and the treads of the wheels, said shaft thus following the vertical movement of the machine during the raising and lowering thereof. Motion is communicated from the drive shaft 13 to the connected series of jacks by any suitable means such as beveled gears 29 and 31 on an extensible shaft 30 meshing with a gear 32 on said drive shaft and with gears 28 carried one each by one of the transverse jack shafts and the longitudinal jack shaft, yokes 33 carried by the shaft 30 and engaging the drive shaft and transverse jack shaft serving to keep the gears in mesh. Obviously when a machine which is run upon the tracks which have previously been adjusted to the size of the machine, its forward movement is checked by the stops when the rear or driving wheels are in operative contact with the treads or spools 14, and the further forward movement of the driving wheels of the vehicle will turn said treads or spools and thus through the described connections cause an elevation of the lifting elements of the screw jacks, and hence an elevation of the automobile, the axles of which have respectively been located above and in the paths of movement respectively of the shoes on the feed screws of the front and rear jacks.

It will be understood furthermore in this connection that any suitable means for throwing the operating means out of gear may be utilized, but by providing the guides 26 which limit the vertical movement of the drive shaft, it is obvious that when the automobile has been raised to the proper level, and before the parts thereof can be disconnected, the treads or spools on said shafts will be withdrawn from contact with the treads of the automobile wheels, and hence further elevation will be prevented.

Reversely when it is desired to lower the machine, the engine of the latter should be driven in the opposite direction, and when the wheels of the car come in contact with the track the drive wheels will cause the machine to move revoluble to again disassociate the drive wheel from said treads or spools.

In addition to the main drive shaft 13 the base may be provided with a second or auxiliary drive shaft 34 mounted in suitable bearings in the track members and having treads or spools 35 for contact with the treads of the driving wheels of the automobile, and any suitable means may be provided in connection with this auxiliary shaft for creating power, such means being indicated in the drawing as consisting of a pulley 36 suitable for the mounting of a belt.

Obviously when the device is to be used as a power mechanism the drive shaft should be disconnected from the jack shafts, for which purpose a clutch mechanism 37 may be employed on the drive shaft for operation by a foot treadle 38 or the equivalent thereof.

From the foregoing description it will be obvious that an automobile may be run upon a device constructed as described and elevated to the described extent to give access to the same for repair, for the replacement of tires and wheels or the like, and that when the same has to be used as a means for driving light machinery in a garage or on a farm, it is only necessary to disconnect the elevating machinery from the drive shaft and connect suitable motion transmitting means with the auxiliary shaft in order to utilize the motive power of the automobile engine, the wheel of the latter serving as an efficient means for maintaining the proper frictional contact between its drive wheels and the treads or spools on said auxiliary shaft. If preferred, and as illustrated, the surface of the treads or spools may be ribbed transversely to increase the frictional contact without any injurious effect upon the wheel tires.

What is claimed is:—

1. A mechanism of the class described having wheel tracks, jacks for engagement with the axle of an automobile, a drive shaft having treads or spools for contact with the treads of the drive wheels of the automobile, connections between said drive shafts and the jacks for communicating movement thereto, guides carried by certain of the jacks, the drive shaft extending through said guides, and springs tensioned between the drive shaft and the tops of said certain jacks, whereby the treads or spools of the drive shaft are maintained in contact with the drive wheels of the automobile as the latter is elevated by the jacks.

2. A mechanism of the class described having wheel tracks, jacks for engagement with the axles of an automobile, a drive shaft having treads or spools for contact with the treads of the drive wheels of the automobile, operative connections between said jacks, an extensible shaft operatively connecting the drive shaft with said operative connections, suspension springs for the drive shaft carried by certain of the jacks, and guides carried by the said certain jacks, the drive shaft extending through said guides, whereby the treads or spools of the drive shaft are maintained in contact with the automobile wheels while the latter is being elevated by the jacks.

3. A mechanism of the class described having a base or frame embodying parallel wheel tracks consisting of telescoping sections and provided at one end with entrance guides and at the other end with stops consisting of curved extensions hingedly connected with the body portions of said tracks, means for securing said stops in their operative positions, jacks for engagement with the front and rear axle of an automobile positioned upon said tracks, a drive shaft having treads or spools for contact with the treads of the automobile drive wheels, connections between said drive shaft and the jacks, and means for maintaining the treads or spools of the drive shaft in frictional engagement with the treads of the automobile drive wheels during the vertical movements of the latter.

In testimony whereof I affix my signature.

RALPH S. SWOPE.